(12) United States Patent
Zhu et al.

(10) Patent No.: US 12,314,065 B2
(45) Date of Patent: May 27, 2025

(54) METHOD AND SYSTEM FOR CONTROLLING PRODUCTION AND STORAGE OF INDUSTRIAL GASES

(71) Applicant: Air Products and Chemicals, Inc., Allentown, PA (US)

(72) Inventors: Zhong-Xiang Zhu, Macungie, PA (US); David M. Espie, Lansdale, PA (US); Graeme Richard Wilson, Surrey (GB)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 406 days.

(21) Appl. No.: 17/886,562

(22) Filed: Aug. 12, 2022

(65) Prior Publication Data

US 2024/0053772 A1 Feb. 15, 2024

(51) Int. Cl.
*G05D 7/06* (2006.01)
*C01B 3/02* (2006.01)
*G05B 19/416* (2006.01)

(52) U.S. Cl.
CPC ........... *G05D 7/0623* (2013.01); *C01B 3/025* (2013.01); *G05B 19/416* (2013.01); *G05B 2219/41108* (2013.01)

(58) Field of Classification Search
CPC ...... C01B 2203/042; C01B 2203/0435; C01B 2203/16; C01B 3/025; C01C 1/0482;
(Continued)

(56) References Cited

U.S. PATENT DOCUMENTS 3,487,657 A 1/1970 Teegarden
5,743,715 A 4/1998 Staroselsky et al.
(Continued)

FOREIGN PATENT DOCUMENTS

CN 108599245 A 9/2018
CN 211040479 U 7/2020
(Continued)

OTHER PUBLICATIONS

Siddiqui O, Ishaq H, Chehade G, Dincer I. Performance investigation of a new renewable energy-based carbon dioxide capturing system with aqueous ammonia; Int J Energy Res. 2020;44:2252-2263; (12 pgs.) Nov. 30, 2019.
(Continued)

*Primary Examiner* — Kidest Bahta
(74) *Attorney, Agent, or Firm* — Matthew Richard Weaver

(57) ABSTRACT

An industrial gas production plant operable to produce a feedstock gas at a variable production rate for supply to the downstream process; and a gas storage resource operable to store produced feedstock gas, the method comprising: determining the pressure of feedstock gas in a supply feed line to the downstream process; selectively controlling, using a control system, a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and selectively controlling, using a control system, a flow rate of feedstock gas in the supply feed line to the downstream process in dependence upon at least one operational parameter of the gas storage resource.

18 Claims, 3 Drawing Sheets

(58) Field of Classification Search
CPC ....... B25B 1/04; B25B 15/081; G05B 13/041; G05B 19/416; G05B 2219/41108; G05D 7/0623
See application file for complete search history.

(56) References Cited

U.S. PATENT DOCUMENTS

| | | | |
|---|---|---|---|
| 7,444,189 B1 | 10/2008 | Marhoefer | |
| 2009/0314227 A1* | 12/2009 | Mahlanen | F02C 7/224 123/3 |
| 2012/0231163 A1* | 9/2012 | Hata | B82Y 30/00 427/249.1 |
| 2013/0139535 A1* | 6/2013 | Nares | F04B 39/10 137/565.11 |
| 2013/0177393 A1 | 7/2013 | Sishtla | |
| 2014/0079593 A1 | 3/2014 | Naito et al. | |
| 2017/0122129 A1 | 5/2017 | Heid et al. | |
| 2017/0145915 A1 | 5/2017 | Heid et al. | |
| 2017/0317502 A1 | 11/2017 | Ito | |
| 2019/0003425 A1* | 1/2019 | Pages | F25J 1/0025 |
| 2022/0033983 A1* | 2/2022 | Higginbotham | C25B 15/02 |

FOREIGN PATENT DOCUMENTS

| | | |
|---|---|---|
| CN | 112086960 A | 12/2020 |
| EP | 3193017 A1 | 7/2017 |
| JP | 2018207728 A | 12/2018 |
| JP | 2022066059 A | 4/2022 |
| WO | 2016170700 A1 | 10/2016 |

OTHER PUBLICATIONS

Guerra, C. Funez, et al; Technical-economic analysis for a green ammonia production plant in Chile and its subsequent transport to Japan; Renewable Energy 157 (2020) 404-414; (11 pgs.) May 9, 2020.

Palys, Matthew J. and Dautidis, Prodromos; "Using hydrogen and ammonia for renewable energy storage: A geographically comprehensive techno-economic study"; Computers and Chemical Engineering 136 (2020) 106785; (13 pgs.) Feb. 23, 2020.

Ishaq, H., Dincer, I.; Design and simulation of a new cascaded ammonia synthesis system driven by renewables; Sustainable Energy Technologies and Assessments 40 (2020) 100725; (14 pgs.) May 6, 2020.

Ozturk M, Dincer I., An integrated system for ammonia production from renewable hydrogen: A case study, International Journal of Hydrogen Energy; (8 pgs.) https://doi.org/10.1016/j.ijhydene.2019.12.127.

Nayak-Luke, Richard, et al; "Green" Ammonia: Impact of Renewable Energy Intermittency on Plant Sizing and Levelized Cost of Ammonia; (10 pgs.) Ind. Eng. Chem. Res. 2018, 57, 14607-14616.

"K-GreeN-Digital-Solutions", Kellogg, Brown & Root LLC; Jan. 2021, 17 pgs.

EP Application No. 23 19 1141 European Search Report; Nov. 27, 2023.

EP Application No. 23 19 1140 European Search Report; Jan. 24, 2024.

* cited by examiner

METHOD AND SYSTEM FOR CONTROLLING PRODUCTION AND STORAGE OF INDUSTRIAL GASES

TECHNICAL FIELD

The present invention relates to a method and system for controlling production and storage of one or more industrial gases in an industrial gas production complex. More particularly, the present invention relates to a method for controlling production and storage of one or more industrial gases in an industrial gas production complex having a variable input power source such as a renewable power source.

BACKGROUND

An industrial gas plant complex may comprise one or more process plants which produce, or are involved in the production of, gases. In non-limiting examples, these gases may comprise: industrial gases, commercial gases, medical gases, inorganic gases, organic gases, fuel gases and green fuel gases either in gaseous, liquified or compressed form.

There is considerable interest in methods and systems for utilising renewable energy sources for powering industrial gas plants and industrial gas plant complexes. However, a significant drawback of the use of renewable energy sources such as wind, solar and tidal power is the natural variability and transient nature of such energy sources.

In general, a constant or substantially constant power supply is preferred for an industrial gas plant or industrial gas plant complex. This enables processes within the industrial gas plant complex to be run at substantially constant and optimal rates for one or more processes within the industrial plant complex.

Consequently, the variable and intermittent nature of renewable power sources (for example, wind, solar and/or tidal power) is problematic for operation of industrial gas plants. Sub-optimal management of incoming power resulting in power shortages may lead to inefficient operation rates and/or shutdowns of various processes. These can be costly in terms of time, expenditure, gas production and lost opportunity. Thus, solutions to these technical problems are required to enable industrial gases to be produced efficiently in such arrangements.

An example of such an industrial gas is Ammonia. Ammonia is produced using Hydrogen from water electrolysis and Nitrogen separated from the air. These gases are then fed into the Haber-Bosch process, where Hydrogen and Nitrogen are reacted together at high temperatures and pressures to produce ammonia.

There is considerable interest in the production of Ammonia using renewable energy. This is known as green Ammonia. However, Ammonia synthesis can be particularly sensitive to the variation in input energy from renewable sources.

Therefore, there exists a need in the art to provide more effective management of gas production and storage to address these issues.

BRIEF SUMMARY OF THE INVENTION

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

According to a first aspect, there is provided a method of controlling the supply of a feedstock gas from an industrial gas facility to a downstream process, the industrial gas facility comprising: an industrial gas production plant operable to produce a feedstock gas at a variable production rate for supply to the downstream process; and a gas storage resource operable to store produced feedstock gas, the method comprising: a) determining the pressure of feedstock gas in a supply feed line to the downstream process; b) selectively controlling, using a control system, a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and c) selectively controlling, using a control system, a flow rate of feedstock gas in the supply feed line to the downstream process in dependence upon at least one operational parameter of the gas storage resource.

In one embodiment, a first valve is located in an input feed line from the supply feed line to the gas storage resource and a second valve is located in an output feed line from the gas storage resource to the supply feed line, and wherein step b) further comprises controlling, using the control system, the first and second valves to control the flow of gas into and out of the gas storage resource.

In one embodiment, the control system comprises a pressure controller and step b) further comprises utilizing the pressure controller to control the first and second valves in response to a difference between the determined pressure and the predetermined set point pressure of the feedstock gas in the supply feed line to the downstream process.

In one embodiment, the pressure controller comprises a split range controller and step b) comprises controlling, with the split range controller, the first and/or the second valve in response to an output value of the split range controller.

In one embodiment, the method further comprises applying gain scheduling to the split range controller such that the gain of the control response of the split range controller is different for each of the first and second valves.

In one embodiment, the operational parameter of the gas storage resource comprises one or more of: gas pressure; average gas pressure in the storage resource; mass of gas in the storage resource; rate of change of gas pressure in the storage resource; and/or rate of change of mass of gas in the storage resource.

In one embodiment, step c) further comprises: d) determining the value of the operational parameter of the gas storage resource; e) selecting a set point feed flow rate of the feedstock gas to the downstream process in dependence upon the determined value; and f) controlling one or more valves in the supply feed line in response to the selected set point feed flow rate.

In one embodiment, step e) further comprises selecting the set point feed flow rate from a memory or look up table in response to the determined value of the operational parameter of the gas storage resource.

In one embodiment, the method further comprises, subsequent to step e): g) iteratively repeating steps d) to f) and, if the value of a new selected set point feed flow rate is different from the previous value of a set point feed flow selected in a previous iteration, then the method further comprises: h) varying the set point feed flow rate between the previous value and the new value over a pre-determined time period.

In one embodiment, the selected set point feed pressure is a constant pressure.

In one embodiment, the industrial gas production plant is powered at least in part by a power supply network including one or more renewable power sources, wherein the power supply network has an available power level which is variable over time, and wherein the feedstock gas production rate of the industrial gas production plant is variable at least in part in response to the available power level of the power supply network.

In one embodiment, a compression section is located downstream of the industrial gas production plant to compress the produced feedstock gas. In an embodiment, the compression section is located in the supply feed line between the industrial gas production plant and a supply outlet to the downstream process, the compression section being located upstream of the input storage feed line and downstream of the output storage feed line.

In one embodiment, the industrial gas production plant comprises a Hydrogen production plant and the downstream process comprises an Ammonia production process.

In an embodiment, there is provided a method of controlling the supply of a feedstock gas from an industrial gas facility to a downstream process, the industrial gas facility comprising an industrial gas production plant powered by a power network including one or more renewable power sources and comprising a supply feed line having a supply outlet to the downstream process and a gas storage resource operable to store feedstock gas, the gas storage resource having an input storage feed line and an output storage feed line each in fluid communication with the supply feed line to form a storage feed loop therebetween, the industrial gas production plant being operable to produce a feedstock gas at a variable production rate for supply to the downstream process and the pressure of gas supplied from the industrial gas production plant to the downstream process being dependent at least in part on the variable production rate, the method comprising: a) determining the pressure of feedstock gas in a supply feed line to the downstream process; b) selectively controlling, using a control system, a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and c) selectively controlling, using a control system, a flow rate of feedstock gas in the supply feed line to the downstream process in dependence upon at least one operational parameter of the gas storage resource.

In an embodiment, there is provided a method of controlling the supply of a feedstock gas from an industrial gas facility to a downstream process, the industrial gas facility comprising an industrial gas production plant powered by a power network including one or more renewable power sources and comprising a supply feed line having a supply outlet to the downstream process and a gas storage resource operable to store feedstock gas, the gas storage resource having an input storage feed line and an output storage feed line each in fluid communication with the supply feed line to form a storage feed loop therebetween, the industrial gas production plant being operable to produce a feedstock gas at a variable production rate for supply to the downstream process, the method comprising: selectively controlling, using a control system, a flow of feedstock gas from the supply feed line to the gas storage resource or from the gas storage resource to the supply feed line in order to adjust the pressure of the feedstock gas in the supply feed line to the downstream process; and selectively controlling, using a control system, a flow rate of feedstock gas in the supply feed line to the downstream process in dependence upon at least one operational parameter of the gas storage resource.

According to a second aspect of the present invention, there is provided a system for controlling the supply of a feedstock gas from an industrial gas facility to a downstream process, the industrial gas facility comprising: an industrial gas production plant operable to produce a feedstock gas at a variable production rate for supply to the downstream process; and a gas storage resource operable to store produced feedstock gas, the system comprising: a pressure controller configured to: determine the pressure of feedstock gas in a supply feed line to the downstream process; and control a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and a flow controller configured to control a flow rate of feedstock gas in the supply feed line to the downstream process in dependence upon at least one operational parameter of the gas storage resource.

In one embodiment, the pressure controller comprises a Proportional-Integral controller.

In one embodiment, the pressure controller comprises a split range controller configured to generate a split range output value and configured to control a plurality of valves in response to the split range output value.

In one embodiment, the split range controller comprises gain scheduling such that the gain of the control response of the split range controller is different for each of the valves.

In one embodiment, the operational parameter of the gas storage resource comprises one or more of: gas pressure; average gas pressure in the storage resource; mass of gas in the storage resource; rate of change of gas pressure in the storage resource; and/or rate of change of mass of gas in the storage resource.

In one embodiment, the system is further configured to: determine the value of the operational parameter of the gas storage resource; select a set point feed flow rate of the feedstock gas to the downstream process in dependence upon the determined value; and control, using the flow controller, one or more valves in the supply feed line in response to the selected set point feed flow rate.

In one embodiment, a compression section is located downstream of the industrial gas production plant to compress the produced feedstock gas. In an embodiment, the compression section is located in the supply feed line between the industrial gas production plant and a supply outlet to the downstream process, the compression section being located upstream of the input storage feed line and downstream of the output storage feed line.

In an embodiment, the industrial gas production facility comprises a Hydrogen production plant and the downstream process comprises an Ammonia production process.

In an embodiment, there is provided a system for controlling the supply of a feedstock gas from an industrial gas facility to a downstream process, the industrial gas facility comprising an industrial gas production plant powered by a power network including one or more renewable power sources and comprising a supply feed line having a supply outlet to the downstream process and a gas storage resource operable to store feedstock gas, the gas storage resource having an input storage feed line and an output storage feed line each in fluid communication with the supply feed line to form a storage feed loop therebetween, the industrial gas production plant being operable to produce a feedstock gas at a variable production rate for supply to the downstream process and the pressure of gas supplied from the industrial gas production plant to the downstream process being dependent at least in part on the variable production rate, the system comprising: a pressure controller configured to: determine the pressure of feedstock gas in a supply feed line to the downstream process; and control a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and a flow controller configured to control a flow rate of feedstock gas in the supply feed line to the downstream process in dependence upon at least one operational parameter of the gas storage resource.

In an embodiment, there is provided a system for controlling the supply of a feedstock gas from an industrial gas facility to a downstream process, the industrial gas facility comprising an industrial gas production plant powered by a power network including one or more renewable power sources and comprising a supply feed line having a supply outlet to the downstream process and a gas storage resource operable to store feedstock gas, the gas storage resource having an input storage feed line and an output storage feed line each in fluid communication with the supply feed line to form a storage feed loop therebetween, the industrial gas production plant being operable to produce a feedstock gas at a variable production rate for supply to the downstream process, the system comprising: a controller configured to control a flow of feedstock gas from the supply feed line to the gas storage resource or from the gas storage resource to the supply feed line in response to the determined pressure in order to adjust the pressure of the feedstock gas in the supply feed line to the downstream process; and a flow controller configured to control a flow rate of feedstock gas in the supply feed line to the downstream process in dependence upon at least one operational parameter of the gas storage resource.

According to a third aspect of the present invention, there is provided a computer readable storage medium storing a program of instructions executable by a machine to perform a method of controlling the supply of a feedstock gas from an industrial gas facility to a downstream process, the industrial gas facility comprising: an industrial gas production plant operable to produce a feedstock gas at a variable production rate for supply to the downstream process; and a gas storage resource operable to store produced feedstock gas, the method comprising: a) determining the pressure of feedstock gas in a supply feed line to the downstream process; b) selectively controlling, using a control system, a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and c) selectively controlling, using a control system, a flow rate of feedstock gas in the supply feed line to the downstream process in dependence upon at least one operational parameter of the gas storage resource.

In one embodiment, a first valve is located in an input feed line from the supply feed line to the gas storage resource and a second valve is located in an output feed line from the gas storage resource to the supply feed line, and wherein step b) further comprises controlling, using the control system, the first and second valves to control the flow of gas into and out of the gas storage resource.

In one embodiment, the control system comprises a pressure controller and step b) further comprises utilizing the pressure controller to control the first and second valves in response to a difference between the determined pressure and the predetermined set point pressure of the feedstock gas in the supply feed line to the downstream process.

In one embodiment, the pressure controller comprises a split range controller and step b) comprises controlling, with the split range controller, the first and/or the second valve in response to an output value of the split range controller.

In one embodiment, the method further comprises applying gain scheduling to the split range controller such that the gain of the control response of the split range controller is different for each of the first and second valves.

In one embodiment, the operational parameter of the gas storage resource comprises one or more of: gas pressure; average gas pressure in the storage resource; mass of gas in the storage resource; rate of change of gas pressure in the storage resource; and/or rate of change of mass of gas in the storage resource.

In one embodiment, step c) further comprises: d) determining the value of the operational parameter of the gas storage resource; e) selecting a set point feed flow rate of the feedstock gas to the downstream process in dependence upon the determined value; and f) controlling one or more valves in the supply feed line in response to the selected set point feed flow rate.

In one embodiment, step e) further comprises selecting the set point feed flow rate from a memory or look up table in response to the determined value of the operational parameter of the gas storage resource.

In one embodiment, the method further comprises, subsequent to step e): g) iteratively repeating steps d) to f) and, if the value of a new selected set point feed flow rate is different from the previous value of a set point feed flow selected in a previous iteration, then the method further comprises: h) varying the set point feed flow rate between the previous value and the new value over a pre-determined time period.

In one embodiment, the selected set point feed pressure is a constant pressure.

In one embodiment, the industrial gas production plant is powered at least in part by a power supply network including one or more renewable power sources, wherein the power supply network has an available power level which is variable over time, and wherein the feedstock gas production rate of the industrial gas production plant is variable at least in part in response to the available power level of the power supply network.

In one embodiment, a compression section is located downstream of the industrial gas production plant to compress the produced feedstock gas. In an embodiment, the compression section is located in the supply feed line between the industrial gas production plant and a supply outlet to the downstream process, the compression section being located upstream of the input storage feed line and downstream of the output storage feed line.

In one embodiment, the industrial gas production plant comprises a Hydrogen production plant and the downstream process comprises an Ammonia production process.

BRIEF DESCRIPTION OF THE DRAWINGS

Embodiments of the present invention will now be described by example only and with reference to the figures in which.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Figure 1:
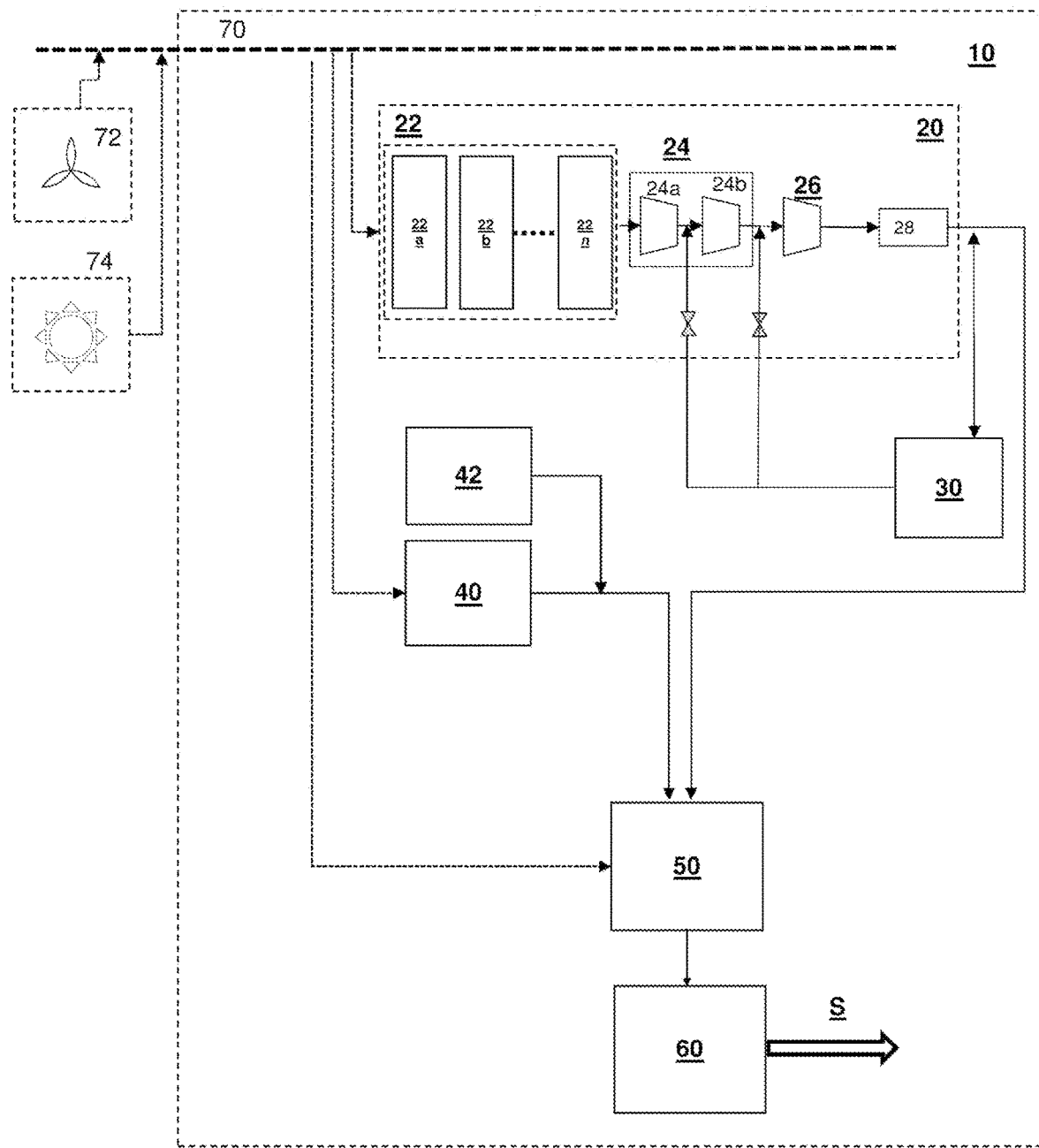
FIG. 1 is a schematic diagram of an exemplary industrial gas plant complex in the form of an Ammonia production plant powered by renewable sources.

FIG. 1 shows a schematic diagram of an exemplary industrial gas plant complex 10. In embodiments, the industrial gas plant complex comprises an Ammonia plant complex 10.

The Industrial gas plant complex 10 comprises a Hydrogen production plant 20, a Hydrogen storage unit 30, an Air Separation Unit (ASU) 40, an Ammonia synthesis plant 50 and an ammonia storage unit 60. The ammonia storage unit 60 is connected to an external supply chain S for onward distribution of Ammonia.

Electricity for powering the Industrial gas plant complex 10 is provided by a main bus 70 supplied by a local power grid (not shown). Power for the industrial gas plant complex 10 is generated at least in part by renewable energy sources such as wind 72 (via a suitable wind farm comprising a plurality of wind turbines) and/or solar energy 74 (via a solar farm comprising a plurality of solar cells) although other sources such as a diesel-, petrol- or Hydrogen-powered generator (not shown) may optionally be utilised. Elements 72, 74 feed into the main bus 70 as shown by the arrows in FIG. 1.

Whilst the above examples of renewable power have been given with regard to wind and solar power, this is not intended to be limiting. For example, other renewable energy sources may be used such as hydro-electric (not shown) and/or tidal power (not shown).

The industrial gas production components of the Industrial gas plant complex 10 will now be described in detail.

Hydrogen Production Plant 20

The Hydrogen production plant 20 is operable to electrolyse water to form Hydrogen and Oxygen. Any suitable source of water may be used. However, in embodiments in which sea water is used to produce the water for the electrolysis, the apparatus would further comprise at least one desalination and demineralisation plant for processing the sea water.

The Hydrogen production plant 20 comprises a plurality of electrolysis units 22a, 22b ... 22n or electrolysis cells. Each unit or cell may be referred to as an "electrolyser" 22a, 22b ... 22n. Any number of electrolysers may be provided. In embodiments, around 100 may be provided. The electrolysers may enable the Hydrogen production plant 20 to have a total capacity of at least 1 GW. In embodiments, the capacity may be in excess of 2 GW; for example, 2.2 GW. However, the ultimate capacity of the Hydrogen production plant 20 is limited only by practical considerations such as power supply.

Any suitable type of electrolyser may be used. In embodiments, the plurality of electrolysers usually consists of a multiplicity of individual cells combined into "modules" that also include process equipment such as pumps, coolers, and/or separators. Hundreds of cells may be used and may be grouped in separate buildings. Each module typically has a maximum capacity greater than 10 MW, although this is not intended to be limiting.

Any suitable type of electrolyser may be used with the present invention. Generally, three conventional types of electrolyser are utilized-alkaline electrolysers; PEM electrolysers; and solid oxide electrolysers. Any of these types may be used with the present invention.

Alkaline electrolysers transport hydroxide ions ($OH^-$) through the electrolyte from the cathode to the anode with Hydrogen being generated on the cathode side. Commonly, a liquid alkaline solution of sodium hydroxide or potassium hydroxide is used as the electrolyte.

A PEM electrolyser utilizes a solid plastics material as an electrolyte, and water reacts at an anode to form oxygen and positively charged Hydrogen ions. The electrons flow through an external circuit and the Hydrogen ions selectively move across the PEM to the cathode. At the cathode, Hydrogen ions combine with electrons from the external circuit to form Hydrogen gas.

Solid oxide electrolysers use a solid ceramic material as the electrolyte that selectively conducts negatively charged oxygen ions ($O^{2-}$) at elevated temperatures. Water at the cathode combines with electrons from the external circuit to form Hydrogen gas and negatively charged oxygen ions. The oxygen ions pass through the solid ceramic membrane and react at the anode to form oxygen gas and generate electrons for the external circuit.

The electrolysers may be arranged in any suitable group. For example, they may be arranged in parallel.

Hydrogen is produced at about atmospheric pressure by the Hydrogen production plant 20. A stream of Hydrogen so generated is removed from the electrolysers at a slightly elevated pressure.

In embodiments, the Hydrogen production plant 20 further comprises Hydrogen compression and purification stages as described below.

In embodiments, the compression stage comprises a multistage compression system having two sections 24, 26. The first section 24 comprises a low pressure (LP) section in which Hydrogen gas is compressed from a first feed pressure from the electrolysers to a second intermediate pressure greater than the first feed pressure.

The second section comprises a medium pressure (MP) section 26 in which the Hydrogen gas is compressed from the second intermediate pressure to a third final pressure greater than the second pressure. The third pressure is selected as required for any downstream process(es).

In the non-limiting embodiment shown in FIG. 1, the first (LP) section 24 has two compressor stages 24a, 24b. However, any suitable number may be used. For example, the LP section 24 may have a single compressor or may have a plurality of compressors.

As shown in the non-limiting embodiment of FIG. 1, the second (MP) section 26 has a single stage of compression (i.e. a single compressor). However, any suitable number of stages may be provided as required, for example, trains of compressors in series and/or in parallel.

The compressors forming part of the first (LP) 24 and second (MP) 26 compression sections may take any suitable form. The person skilled in the art would readily be aware of the form, number and capacity of these compressors. For example, for a total electrolyser capacity of 1 GW, 2 to 4 compressors would typically be required. 5 or more may be required for total electrolyser capacity of 2GW.

In the embodiment of FIG. 1, a purification section 28 is provided. The purification section 28 may be required where, for example, any downstream processes require higher purity Hydrogen (i.e. with reduced levels of water and/or oxygen inherently present in the compressed Hydrogen gas produced by the electrolysis). However, this need not be the case and this section may be omitted if not required.

If provided, the purification section 28 comprises a "DeOxo" unit operable to remove oxygen. The DeOxo unit operates through the catalytic combustion of Hydrogen to produce water compressed Hydrogen gas from which Oxygen has been removed.

The purification section 28 may further comprise a drier. In this embodiment, the drier comprises a temperature swing adsorption (TSA) unit to produce dry compressed Hydrogen gas for the downstream process(es). However, other suitable drier and/or adsorption technologies may be used here. In embodiments, the drier is downstream of the DeOxo unit.

A downstream processing unit may be any unit that utilises Hydrogen gas as a feedstock. In embodiments, the downstream processing unit is or includes an Ammonia synthesis plant. However, this need not be limiting.

Further details of the Hydrogen production plant 20 will be discussed below.

Hydrogen Storage Unit 30

Any Hydrogen surplus to immediate requirements may be stored in the Hydrogen storage unit 30. The storage unit 30 may comprise any suitable a plurality of short-term and longer-term storage options with different sizes, filling/discharge rates, and roundtrip efficiencies.

Typical storage system could include pressure vessels and/or pipe segments connected to a common inlet/outlet header. The pressure vessels may be spheres, for example, to about 25 m in diameter, or "bullets" which are horizontal vessels with large L/D ratios (typically up to about 12:1) with diameters up to about 12 m. In certain geographies, underground caverns may be included as storage systems to flatten out the seasonal variations associated with the renewable power.

In the context of the present embodiments, stored Hydrogen may be used as a reservoir for Ammonia Synthesis plant 50 to ensure sufficient supply. This will be discussed in further detail below.

Air Separation Unit 40

In non-limiting embodiments, the Nitrogen gas required for Ammonia production is produced by cryogenic distillation of air in the air separation unit (ASU) 40. Typically an ASU 40 has various stages operating at different pressures. For example, a high pressure (HP) Column operates at around 10.5 bar g and a low pressure (LP) Column operates at around 5 bar g. Gaseous Nitrogen is produced by the ASU 40 at pressures in excess of 25 bar g. The pressure is then reduced to provide a stream of Nitrogen gas in one or more pipes arranged to transport Nitrogen to the Ammonia Synthesis plant 40. However, other Nitrogen sources may be used if required, for example, Liquid Nitrogen storage 42.

Liquid Nitrogen storage unit 42 may comprise any suitable Liquid Nitrogen Storage, Vaporisation and Distribution (LIN SVD) arrangement. The storage unit 42 may comprise a plurality of short-term and longer-term storage options having different sizes, filling/discharge rates, and roundtrip efficiencies.

A typical storage system for Liquid Nitrogen may comprise a plurality of pressure vessels and/or pipe segments connected to a common inlet/outlet header. The pressure vessels may comprise low pressure flat bottom storage tanks (FBTs). Additionally or alternatively, the pressure vessels may be spheres, for example, to about 25 m in diameter, or "bullets" which are horizontal vessels with large L/D ratios (typically up to about 12:1) with diameters up to about 12 m.

Preferably, the Nitrogen gas produced by the ASU 40 is compressed by a compressor and cooled to be stored in the Nitrogen storage unit 40 in liquid form. However, gaseous Nitrogen storage may also be provided. The storage unit 40 may be used as a reservoir for Ammonia synthesis plant 50 which may be fed by a connecting pipe.

Ammonia Synthesis Plant 50

The Ammonia Synthesis plant 50 operates on the Haber-Bosch process and comprises an Ammonia Loop. An Ammonia Loop is a single unit equilibrium reactive system which processes the synthesis gases of Nitrogen and Hydrogen to produce Ammonia.

Nitrogen is provided by one or more pipes from the ASU 40 (or storage 42) which, in embodiments, may run continuously to provide Nitrogen. Hydrogen is provided from one or more pipes from Hydrogen production plant 20 either directly (if it is running based on the availability of the renewable power at given instance) or from the Hydrogen storage 30.

Stoichiometric composition of synthesis gas is processed by a syn-gas compressor system (not shown) and the resulting Ammonia product is refrigerated by another set of compressors (not shown) and sent to storage 60 if required. The performance of Ammonia loop is governed by the equilibrium conversion of the exothermic reaction. The parameters for this will be discussed below.

Renewable Electricity Supply Variation

Electricity for the plant 10 as a whole is supplied by the main bus 70. As shown in FIG. 1, in embodiments, the electricity is generated from at least one renewable energy source of either wind energy 72 (via a suitable wind farm comprising a plurality of wind turbines) and/or solar energy 74 (via a solar farm comprising a plurality of solar cells). In addition, other renewable energy sources may be used such as hydro-electric (not shown) and/or tidal power (not shown).

A battery or other energy storage resource (not shown) may be used to provide at least some power during times when power generation from renewable sources are low. Nevertheless, for a gas plant complex 10 powered predominantly or entirely by renewable sources, there will inevitably be variations in power availability.

For example, on a typical summer's day solar power availability is high for a significant proportion of the day. Wind power availability is also high. Therefore, power generated from renewable sources may maintain a generally constant baseline and a high peak early in a given day. In such a situation the supplied energy is plentiful.

However, on a typical winter day in which sunlight and wind levels are lower. Generated power may be at or close to zero during the night and reaches a relatively smaller peak during the middle of the day. Whilst the energy storage resource 76 can compensate for short term power availability reductions, such a resource is unlikely to compensate for the overall shortfall.

The problem of power availability is further complicated by the different ramp rates within the different elements of the Ammonia production process. For example, whilst the Hydrogen production plant 10 may be able to ramp up or down compression and purification stages at a rate comparable to the electrolysis process, the Ammonia synthesis plant 50 can only be allowed to ramp at a rate 10 to 20 times slower.

It is therefore necessary to provide a suitable and controlled buffer of synthesis gas storage to bridge and smooth the ramping processes under conditions of power variation. Further, physical infrastructure and space availability, as well as capital expenditure, constrain the amount of gas storage which can be reasonably provided.

Consequently, it is necessary to manage the production and storage of one or more gases within the plant to ensure efficient operation from renewable sources whilst minimising the size of the necessary gas storage buffers. Embodiments address these issues.

Gas Production and Storage Configuration

Figure 2:
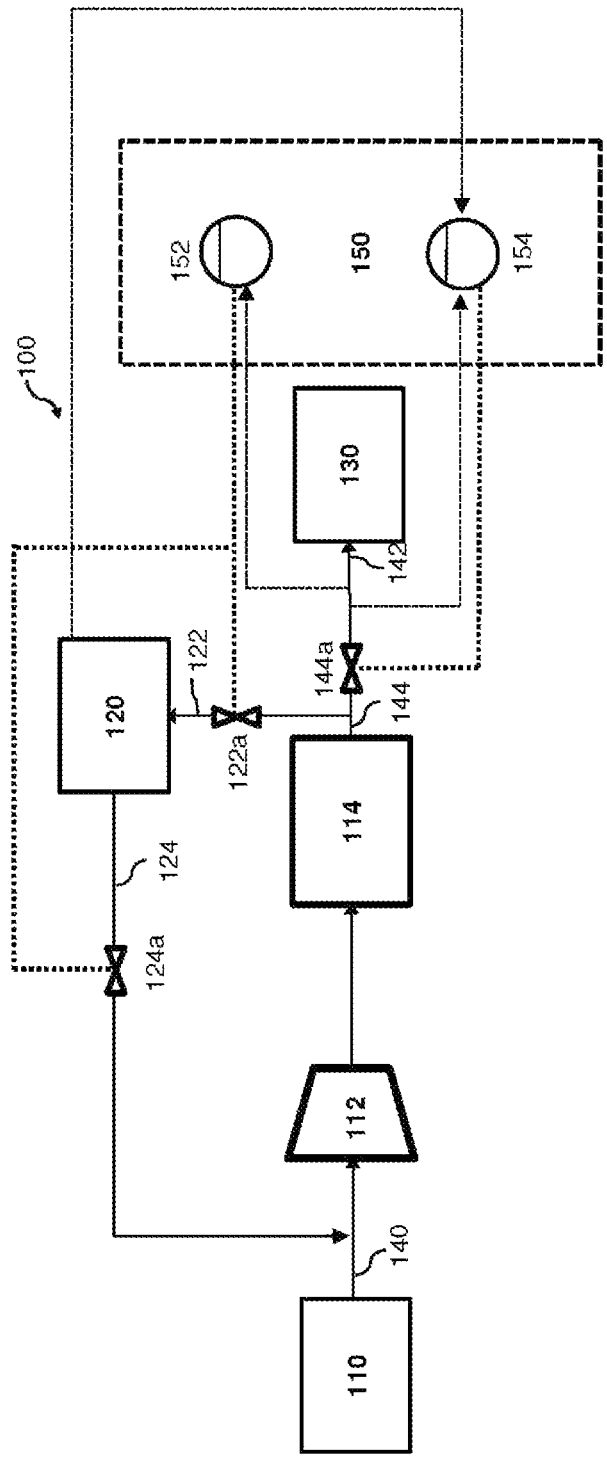
FIG. 2 is a schematic diagram of a production and storage facility for producing and supplying a feedstock gas according to an embodiment.

FIG. 2 shows an exemplary schematic of an embodiment of a gas production and storage system 100 suitable for use with the industrial gas plant 10 of FIG. 1. The described embodiment may be applicable to the Hydrogen production plant 20 and/or the ASU 40 in the exemplary embodiments. However, this is not intended to be limiting and the system 100 may in principle be applicable to any gas production and storage process.

The production and storage system 100 comprises an industrial gas production plant 110 and a gas storage resource 120. The industrial gas production plant 110 is arranged to produce industrial feedstock gas for use in a downstream process unit 130. The industrial gas production plant 110 may comprise a Hydrogen production plant or an ASU as discussed above. Alternatively, the industrial gas production plant 110 may comprise any suitable gas production facility. The skilled person would be readily aware of the types of facility that could be used in the present embodiment.

The industrial gas production plant 110 produces industrial feedstock gas at a production rate which is dependent at least in part on the available power level, e.g. from the main bus of FIG. 1. As the available power level drops, then the industrial gas production plant 110 will unload. In embodiments, the industrial power plant 110 will unload in proportion to the reduction in power. In embodiments, the industrial power plant 110 will unload in stages or discrete steps; for example, if the industrial production plant 110 comprises a plurality of electrolyser units, the units may shut down one by one when a power threshold is reached.

The unloading of the industrial gas production plant 110 will mean that the production rate of feedstock gas from the industrial gas production plant 110 will reduce. This will reduce the mass flow of gas produced and provided to the downstream process 130.

Concomitantly, when the power level is increased, the industrial production plant 110 will ramp up and load. Again, in embodiments, this may be continuous, or may be in the form of discrete steps depending on the configuration of the industrial production plant 110.

The variation in production rate of feedstock gas in the industrial gas plant 110 is, in embodiments, primarily due to the variation in the available power level. This variation is time dependent. As described below, the variation may manifest in a measurable change in output pressure of feedstock gas to the downstream process 130. This may be the case irrespective of whether any compression or post-processing steps are included downstream of the gas plant 110 as described below.

In embodiments, the maximum capacity of the industrial gas production plant 110 when available power is at or close to a maximum level is greater than that required to meet the required pressure to the downstream process 130, then feedstock gas may be diverted to storage 120

Any suitable downstream process unit 130 may be used which utilises the produced gas as a feedstock. Examples of suitable downstream process units 130 may include an oil refinery, a steel manufacturing facility, an ammonia synthesis plant or a Hydrogen liquefaction plant as described below. In some embodiments, a plurality of downstream process units 130 may be used in parallel.

The downstream process may comprise a single process or a plurality of downstream processes arranged in parallel. In embodiments where the produced gas comprises Hydrogen gas, the downstream process(es) could include any process that may use "grey" or "blue" Hydrogen, for example: steel manufacture and oil refinery operations.

In preferred embodiments, at least some or all of the produced gas is Hydrogen gas used to produce ammonia as described above and discussed in embodiments below.

In alternative embodiments, the produced Hydrogen gas may used to produce methanol via, for example, $CO_2$ Hydrogenation. In other alternative embodiments, the produced Hydrogen gas may be liquefied by cryogenic cooling.

The above downstream processes are examples and are not intended to be limiting. Further, any suitable combinations of the above examples may be used together, with a proportion of the produced gas going to one downstream process and the other proportion being sent to a different downstream process (e.g. if the produced gas is Hydrogen, the downstream processes may comprise part Ammonia production and part liquification by cryogenic cooling).

A supply feed line 140 extends from an output header of the gas production plant 110 to a supply outlet 142 in fluid communication with the downstream process unit 130.

Downstream of the gas production plant 110 is a compression section 112 and a purification section 114. The compression section 112 and purification section 114 are located in the flow path along supply feed line 140.

The compression section 112 may comprise any number of compressor stages, either in series or in parallel. The compressors may take any suitable form; for example, centrifugal or reciprocating.

A discharge header 144 of the supply feed line 140 is located downstream of the purification section 114 and comprises a control valve 144a to control the flow of gas to the downstream process unit 130.

The purification section 114 may not be required depending upon the industrial gas in question. However, if the gas in question is Hydrogen, then the purification section 114 may comprise a "DeOxo" unit in which oxygen is removed by the catalytic combustion of Hydrogen to produce water and oxygen-depleted compressed Hydrogen gas, which may then be dried in a drier such as an adsorption unit, for example, a temperature swing adsorption (TSA) unit.

The gas storage resource 120 may comprise pressure vessels and/or pipe segments connected to a common inlet header and a common outlet header. The pressure vessels may be spheres, for example, to about 25 m in diameter, or "bullets" which are horizontal vessels with large L/D ratios (typically up to about 12:1) with diameters up to about 12 m. In certain geographies, underground caverns may be included as storage systems to flatten out the seasonal variations associated with the renewable power.

In embodiments, the gas storage resource 120 may comprise a plurality of pressure vessels such as spheres or bullets. In embodiments, the gas storage resource 120 may comprise 10 spheres or bullets, preferably 20 spheres or bullets. In specific embodiments, 22 bullets may be provided.

In normal operation, the pressure within the plurality of storage vessels forming the gas storage resource 120 is regulated as a group. As a result, the pressure within the individual vessels (e.g. spheres or bullets) is the same (within tolerance limits) irrespective of the number of individual storage vessels (e.g. bullets or spheres). Thus, the individual storage vessels of the gas storage resource 120 can be treated as a unitary vessel for calculation purposes.

The gas storage resource 120 is arranged in a parallel feed loop with the compression section 112 and purification section 114. An inlet feed line 122 extends from the supply feed line 140 downstream of the discharge header 144 to the inlet header of the gas storage 120. A control valve 122a is located in the inlet feed line 122 to control flow of gas into the gas storage resource 120.

An outlet return feed line 124 extends from the outlet header of the gas storage resource 120 to the supply feed line 140 upstream of an inlet header of the compression section 112. Flow from the gas storage resource 120 is controlled by control valve 124a which selectively enables gas from storage to be fed back into the supply feed line 140 and into the compression section 112 and purification section 114 via return line 124.

Gas flow from the gas storage resource 120 may be regulated at a specific pressure which may, in embodiments, be different from that in the actual storage vessels. For example, for space efficiency and technical considerations, the gas within the individual storage vessels may be stored at a relatively high pressure, for example in embodiments this may be 26 bara. However, when supplied via the outlet return feed line 124 this may be reduced or let down to a lower pressure such as, for example, 2-7 barg, more particularly 4 barg, more particularly 4.2 barg.

In this arrangement, compressed and purified gas can be directed seamlessly and as appropriate from either storage or from production to the downstream process unit 130. Alternatively, gas which has been produced above demand from the downstream process unit 130 can be sent direct to the gas storage 120 for later use.

Gas Control System

A control system for controlling the gas production and storage system 100 will now be described.

A gas control system 150 is provided to control the flow of gas within the system 100. The gas control system 150 comprises two control levels—gas production pressure control via pressure indicator controller (PIC) 152 and production rate control for controlling feed flow to the downstream process unit 130 via flow indicator controller (FIC) 154.

Gas Pressure Control

The PIC 152 is operable to control valves 122a and 124a in order to regulate the pressure of gas in the discharge header 144 downstream of the production process and upstream of the downstream process unit 130.

The PIC 152 comprises a regulating split-range controller. The PIC 152 is operable to maintain a control (or process) variable at a constant set point by adjusting two manipulated variables according to a split range.

The manipulated variables comprise parameters of the plant which can be controlled directly. The control variables, in general, relate to process outputs from the plant which are not controllable directly but are dependent upon the values of the manipulated variables. In the present embodiment, the control variable is the pressure of gas P in the discharge header 144, and the manipulated variables correspond to the control valves 122a, 124a.

The PIC 152 utilises proportional-integral (PI) control of the control variable of the discharge header 144 pressure P. However, other methods, for example a proportional-integral-derivative (PID) controller may be used.

The PIC 152 is operable to maintain a constant pressure set point SP(P) for the pressure P (which is the process variable PV). In other words, the set point (SP) is a target value and the process variable (PV) is the measured value of the real-world parameter that my diverge from the desired set point. The error from the set point is the difference between the SP(P) and PV and is defined as set out in equation 1) below.

The value of the set point may be determined manually, automatically or empirically. In embodiments, the pressure P is set at a feed pressure for optimal operation of the downstream process unit 130. In order to achieve this, the PIC 152 utilises a PI control loop whereby the difference between the measured pressure P (variable PV(P)) and the desired set point pressure SP(P) is first determined in accordance with equation 1):

$$e(t)=SP(P)-PV(P) \qquad 1)$$

Where e(t) is the error between the set point and the process variable as a function of time.

This value v is sent to the split-range block of the PIC 152 which splits value v into the two manipulated variables, i.e. generates output control signals to control the control valves 122a, 124a.

In order to achieve this, it is determined whether v is below or above the split value of the split-range controller. In embodiments, the split value is 50% although any other suitable value may be used.

If the output value from the split-range block has a range between 100% and 50% then then control valve 122a is manipulated. This may be in a continuous manner. Conversely, if the output value from the split-range block has a range between 50% and 0% then then control valve 124a is manipulated. In embodiments, the split range PIC 152 uses exclusive valve sequencing such that an "either-or" relationship exists between the valves 122a, 124a and gas flows through one valve or through the other, but never through both simultaneously.

In other words, when the PIC 152 output is between 50 and 100%, control valve 122a is progressively opened to enable gas flow to the gas storage resource 120. This situation may occur when the gas pressure P is above set point such that the gas production plant 110 is producing additional gas per unit time than is required by the downstream process unit 130, and as such the excess gas is surplus to requirements. In this scenario, the gas pressure P in the discharge header 144 is reduced by transferring excess gas to the gas storage resource 120 for later use.

Concomitantly, if the gas pressure P is lower than the set point SP(P), then the gas production facility 120 is unable to produce gas at the required rate (potentially due to lack of available renewable power) and stored gas from the gas storage resource 120 is required to supplement the produced gas in order to maintain the desired set point SP(P) pressure of gas P as feedstock for the downstream process unit 130. Consequently, if the PIC 152 output is between 50% and 0% then gas flows from the gas storage resource 120 to the inlet to the compressor section 112 to supplement the produced gas.

Gain Scheduling

A key aspect of effective split-range control is to ensure stable control of the processes whilst providing acceptable control performance. A PI controller such as may be implemented in the PIC 152 typically operates in a linear fashion. In other words, the control valves 122a, 124a will be controlled in a generally identical linear fashion with respect to the PIC 152 output. The valves 122a, 124a may be continuously variable between open and closed positions, or they may be variable in a step-wise fashion spatially and/or temporally (e.g. variation of open/close duty cycle).

Therefore, taking valve 122a as an example, this valve will open generally linearly from a closed position or fractionally open position at a PIC 152 output of 50% to fully open at a PIC 152 output of 100%.

However, complex gas production systems are often non-linear, or involve non-linear processes. As a result, controlling such systems in an equal and purely linear manner may cause system instability. This may be particularly acute when operating at the boundary of different operating modes (e.g. at an output around 50%, moving from a regime of gas feed to storage to a regime of gas being fed from storage).

One option to address this is to implement a "dead band" where a predetermined PIC 152 output range (e.g. 49 to 51%) does not result in any movement of the valves 122a, 124a to reduce instability.

An alternative or additional approach is to implement gain scheduling. Gain scheduling effectively implements one or more scaling factors $K_c$ for one or more values or ranges of values of the PIC 152 output. A higher value of $K_c$ means that a greater valve response is provided per unit change in PIC 152 output percentage. In other words, the value of Kc is a multiplication factor on the proportional error, and a higher value essentially causes the controller to be more aggressive when responding to errors away from the set point.

This scheduling may be asymmetrical and different values of $K_c$ implemented for different sides of the split range. In the present embodiment for example, it may be desired to implement a relatively large response per unit % when opening valve 122a to enable excess gas to be routed to storage, whereas it may be desired to implement a slower response when feeding gas from storage to the compression section 112.

A gain schedule requires a minimum of two sets of different parameters. However, any number of parameters may be implemented across any suitable number of ranges as required. A gain schedule may be stored in a memory of the PIC 152; for example in a suitable look-up table.

Flow Control to Downstream Processes

The above control system element as described enables efficient use of available power resources to enable temporary over-production and storage of gas when renewable power levels are high, and use of said stored gas at times of low renewable power levels.

In an ideal situation, sufficient gas storage would be provided to ensure that all periods of expected low renewable power could be covered by stored gas resources. However, physical, practical and capital expenditure constraints place a practical limit on the size of available gas resources. This means that, in a practical context, the finite size of gas resources must be factored in when considering the control system.

Further, certain process plant configurations have a disparity in practical and safe ramp rates that can be achieved between processes. Taking the example of Ammonia production, Hydrogen electrolysers, compressors and purifiers may be able to ramp production up or down rapidly in response to local renewable power variations. However, the Ammonia production plant has a safe and practical ramp rate of the order of 10 to 20 times slower. Such processes must be protected from sudden changes in feedstock flow.

The inventors have recognised, for the first time, that the above practical considerations require further control aspects to be implemented to enable safe and reliable operation of a process plant having multiple gas production processes therein.

In this regard, the control system 150 implements production rate control for controlling feed flow to the downstream process unit 130 via the flow indicator controller (FIC) 154. In embodiments, the FIC 154 may be associated with a controller of the downstream process 130. In other embodiments, the FIC 154 may be associated with the industrial gas plant 110.

The FIC 154 utilises a supervisory control system to control valve 144a in the feedstock header 144 providing gas to the downstream process unit 130. The FIC 154 implements a proportional integral (PI) control system to control the control variable of the discharge header 144 flow rate F. However, other methods, for example a proportional-integral-derivative (PID) controller may be used.

In embodiments, the FIC 154 controls a feedstock flow rate F by setting a flow set point SP(F) at least in part in dependence upon one or more operational parameters of the gas storage resource 120. By this is meant a measurable parameter of the gas storage resource 120 in use. The measurable parameter is used to determine the amount and/or availability of gas stored within the gas storage resource 120 which can be used In non-limiting embodiments, the parameter may be selected from one or more of: the gas inventory; gas pressure in the storage resource 120; average gas pressure in the storage resource 120; mass of gas in the storage resource; rate of change of gas pressure in the storage resource 120; and/or rate of change of mass of gas in the storage resource 120.

Note that, as described above, in embodiments where the gas storage resource 120 comprises a plurality of individual storage vessels which are connected in such a manner that the pressure is regulated therebetween, then the average gas pressure will correspond to the pressure in any one individual vessel.

In preferred embodiments, the gas pressure in the storage resource is the measured operational parameter. This value may be measured continuously or at discrete time periods. In preferred embodiments, this value is measured or reported continuously.

As discussed above, in embodiments the gas pressure in the gas storage resource 120 may be different from that at the outlet header common to all vessels within the storage resource 120. For example, the pressure may be let down to a specific level (for example, 4 barg) for convenient use in downstream processes. Intrinsically this is a less preferred operational parameter to measure since it may remain a constant. However, in embodiments, this let down may not be utilized and it may instead be possible to use the pressure in the outlet header as an indicator of the gas inventory of the gas storage resource 120.

In addition to pressure, in embodiments other metrics may be measured. For example, the true contents (i.e. useable mass) of the gas storage resource 120 may be determined and used as an operational parameter. Given the volume of the one or more storage vessels forming part of the gas storage resource 120 is generally constant and known, the mass of gas can be calculated from PV=nRT. Mass of gas is dependent upon the temperature. However, within an expected operational temperature range of between 15 and 50 degrees Celsius, the mass of gas which can be stored is expected only to vary between 14-15%.

As noted above, in a connected system with interconnected storage vessels the measured pressure is constant and regulated across the different vessels. So the measurement of one vessel will provide an indication of pressure across the entire gas storage resource 120. Thus, in embodiments, it may not be necessary to measure the pressure in each vessel individually and the measurement of pressure (or other operational parameter) of a single vessel forming part of the gas storage resource 120 may be sufficient.

However, the above is not to be taken as limiting and the skilled person would recognise that variations may be possible. For example, the gas pressure or rate of change of pressure in the gas storage resource 120 may be measured at only one or more of the storage vessels forming part of the storage resource 120 or may be averaged across all of the vessels locally as required.

The determination and/or measurement of the gas pressure in the storage resource 120 provides information on the conditions of the renewable power supply. If the PIC 152 determines that the measured pressure P is below the set point pressure SP(P) then the PIC 152 is operable to open the valve 124a such that gas flows from the storage resource 120 into the supply line 140 to assist the industrial gas production plant 110, then the gas production plant 110 cannot maintain the set point pressure SP(P) based on its production rate alone.

Thus, the amount of renewable power available at that point in time is either sub-optimally low or decreasing. As the feedstock gas is used, the pressure in the gas storage resource 120 decreases. Thus, the pressure in the gas storage resource 120 provides a measurable indication of the status and true contents of the gas storage resource 120.

Under such conditions, stored gas is being used and the gas storage resource 120 is being depleted. At a predetermined point, it is therefore necessary to begin the process of ramping down the downstream process unit 130 in anticipation that the required feedstock gas may soon not be available at the presently required pressure from either the production plant 110 or the gas storage resource 120.

The ramping down process for specific downstream processes (e.g., Ammonia production) may necessarily be relatively slow compared to other plant elements such as, for example, an industrial gas production plant in the form of a Hydrogen production plant. In other words, ramp rates between two different operational capacity levels are determined on one level by mechanical, chemical and physical limitations or requirements of the process plants themselves, and place constraints on the rate of change of production processes in these plants.

For example, in non-limiting embodiments, the ramp rates for a Hydrogen production plant (comprising electrolysers and compressors as described below) may be of the order of tens of % per minute. However, ramp rates for an Ammonia production plant may be of the order of tens of % per hour.

Thus, in embodiments, an advance warning of potential gas shortages is beneficial so that a new process rate for the downstream process can be established at the correct time in order to utilize less gas. This avoids a potential shut down of the downstream process 130 or a ramp rate of the downstream process 130 beyond design or safety tolerances.

In embodiments, this problem is addressed by use of the FIC 154. The FIC 154 controls the feedstock flow rate F in dependence upon the gas pressure of the gas storage resource 120. This may, in embodiments, be achieved by setting a new flow set point SP(F) means of a look-up table or other implemented scheme with measured pressure values compared to predetermined threshold levels.

Once a particular pressure is determined which triggers a new threshold for the set point flow rate SP(F), a time delay is implemented to enable the downstream process unit 130 to adjust to the new, lower, set point flow rate SP(F). This process continues as the pressure detected at the storage resource 120 increases or decreases further.

The time delay may, in embodiments, involve a continuous transition in flow rate between the two discrete values. This may be done in synchronicity with the downstream process 130 to ensure gas supply matches the current production rate of the downstream process 130 during the ramping transition. In embodiments, the ramp rate may be of the order of 1-10% per minute. In preferred embodiments, the ramp rate may be 3%.

The value or change in value of the flow set point SP(F) may, in embodiments not be triggered only on the absolute or relative value of one or more operational parameters of the gas storage resource 120 as determined or measured (for example, the storage pressure or rate of change of storage pressure in the gas storage resource 120) but also may utilize other constraints or conditions on the operational parameters of the gas storage resource 120 that may be required to maintain the set point flow rate SP(F).

For example, this may apply in situations where gas storage contents in the gas storage resource 120 are low but the renewable power available is high. In such situations ramping down of the production rate of the downstream process unit 130 is not required and, in principle, the downstream process unit 130 may run a nominal or full operational capacity.

However, in embodiments, it may nevertheless be desirable to maintain the production rate of the downstream process unit 130 at a lower level to enable excess feedstock gas to be used to replenish the gas storage resource 120 to a desired pressure or level of contents. Thus, a trade-off is necessary with regard to the requirement to produce the maximum gas output in the downstream process per unit time vs management of the gas storage inventory to minimize the risk of shutdowns or operation outside of normal parameters due to excess depletion of the contents of the gas storage resource 120.

In optional embodiments, these decisions can be implemented by a further level of control configured to specify a particular set point target for one or more operational parameters of the gas storage resource 120. For example, in embodiments, a set point target pressure may be implemented for the gas storage resource 120 in response to other measured or predicted parameters or variables of the production and storage system 100. This may, in embodiments, use parameters such as available power and/or production rate of the industrial gas production plant 110.

For example, in optional embodiments, if it is determined that the available power level of the power network supplying the industrial gas production plant 110 is above a certain threshold and that the industrial gas production plant 110 is operating at a nominal or maximum capacity (or at least above a certain production capacity threshold value) but the gas storage resource 120 has a value of an operational parameter (e.g. storage pressure) below a desired set point target, then the control system may prioritise replenishing the gas storage resource 120 rather than increasing the flow rate of gas to the downstream process 130.

In embodiments, this determination may be made by a suitable master controller. The master controller may comprise, in embodiments, model predictive control. Model predictive control may, in embodiments, comprise a multivariable control algorithm that utilizes an internal dynamic model of one or more components of the production and storage system 100, an appropriate cost function, and an optimization algorithm which is operable, in embodiments, to minimize the cost function using a plurality of control inputs. Alternative functions may be used. These may involve, for example, similarity functions which are maximized.

The master controller may therefore implement model predictive control (MPC) to control the production and storage system 100 in response to process variables and parameters whilst, in embodiments, satisfying a plurality of constraints. In embodiments, the MPC may derive an operation policy including set point operation parameters for one or more of the industrial gas plant 110, gas storage resource 120 and downstream process unit 130 over a predetermined future time horizon. These parameters are then used to control the relevant processes.

The MPC may optimize the set point target for one or more operational parameters of the gas storage resource 120 for a present time period, whilst also being able to adapt for future time periods. This may be achieved, in embodiments, by optimizing a finite time horizon for the processes whilst implementing the current time period. The optimization is then performed again at the next time period.

In summary, in embodiments, by controlling the flow rate of gas provided to the downstream process unit 130 in response to one or more operational parameters of the gas storage resource 120, this can assist in smooth running of the production and storage system 100 as a whole when considering the variability of available renewable power. As the available supplied power is reduced, the industrial gas production plant 110 will be required to ramp down accordingly and, as a result, the gas production throughput from the industrial gas production plant 110 will be reduce. This will be supplemented by available gas storage resources during this period. Concomitantly, when the available supplied power increases, the industrial gas production plant 110 will be able to ramp up and, potentially, return to optimum production levels. Under these conditions, the gas storage can be replenished and production rates increased.

For certain gas facility types, for example electrolysers to produce Hydrogen gas which require significant power resources and have a relatively fast ramp rate, the production level of the industrial gas production plant 110 may substantially correspond to the available power level as a function of time, accounting for a time lag resulting from the ramp rates. However, for certain facility types, e.g., those with slower ramp rates, there may be a less direct relationship between available power and production levels.

Nevertheless, the use of control systems as outlined above in conjunction with gas storage are critical when operating under variable input power conditions such as in the case of renewable power supply and where a downstream process unit 130 may have a much slower ramp rate and so needs to be shielded from rapid changes in feedstock flow rate.

EXAMPLE

Figures 3, 4:
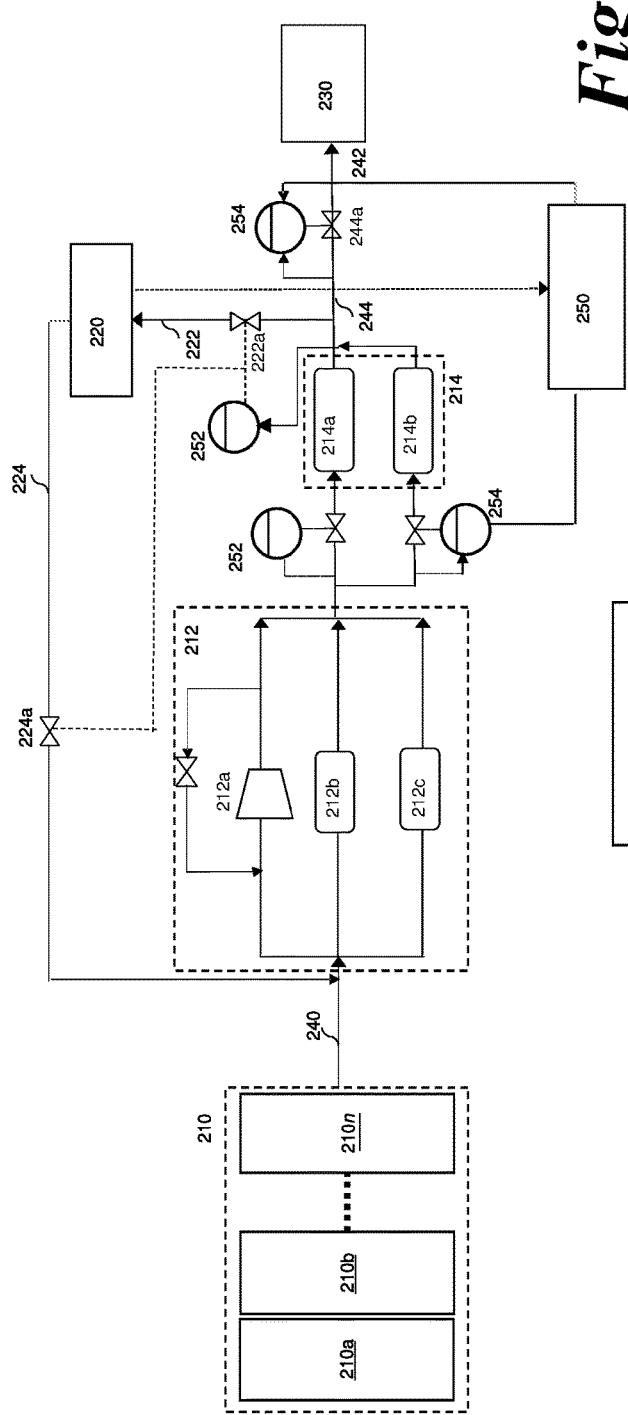
FIG. 3 is a schematic diagram of a production and storage facility for producing and supplying Hydrogen gas as a feedstock according to an embodiment.
FIG. 4 is a flow chart of a method according to an embodiment.

FIG. 3 shows another embodiment applied to a Hydrogen production plant and Hydrogen storage similar to that disclosed in, and suitable for use with, the embodiment of FIG. 1.

The production and storage system 200 comprises a Hydrogen production plant 210 and a Hydrogen gas storage resource 220. In common with the first embodiment, the Hydrogen production plant 210 is operable to electrolyse water to form Hydrogen and Oxygen.

A downstream process unit 230 is provided in the form of an Ammonia Synthesis plant 230 operating on the Haber-Bosch process and comprising an Ammonia Loop as described in relation to the first embodiment of FIG. 1 and the relevant details discussed therein also apply here.

A supply feed line 240 extends from an output header of the Hydrogen production plant 210 to a supply outlet 242 in fluid communication with the Ammonia Synthesis plant 230.

The Hydrogen production plant 210 comprises a plurality of electrolysis units 210a, 210b . . . 210n or electrolysis cells. Each unit or cell may be referred to as an "electrolyser" 210a, 210b . . . 210n. Any number of electrolysers may be provided. In embodiments, around 100 may be provided. Examples of suitable electrolysers and associated equipment are described in detail with respect to the embodiment of FIG. 1 and also apply here.

Hydrogen is produced at about atmospheric pressure by the Hydrogen production plant 210. A stream of Hydrogen so generated is removed from the electrolysers at a slightly elevated pressure. In embodiments, compression and purification sections 212, 214 are provided.

In embodiments, the compression section 212 comprises a multistage compression system having three stages in parallel. On a first path lies a centrifugal compressor 212a, and the remaining paths comprise medium pressure (MP) sections 212b, 212c having a train of suitable compressors. The final output pressure is selected as required for the downstream process(es).

The purification section 214 comprises a plurality of "DeOxo" units 214a, 214b in parallel, in each of which oxygen is removed by the catalytic combustion of Hydrogen to produce water and oxygen-depleted compressed Hydrogen gas, which may then be dried in a drier such as an adsorption unit, for example, a temperature swing adsorption (TSA) unit.

The gas storage resource 220 may comprise pressure vessels and/or pipe segments connected to a common inlet header and a common outlet header. The pressure vessels may be spheres, for example, to about 25 m in diameter, or "bullets" which are horizontal vessels with large L/D ratios (typically up to about 12:1) with diameters up to about 12 m. In certain geographies, underground caverns may be included as storage systems to flatten out the seasonal variations associated with the renewable power.

As for the second embodiment, the gas storage resource 220 is arranged in a parallel feed loop with the compression section 212 and purification section 214. An inlet feed line 222 extends from a discharge header 244 of the supply feed line 240 downstream of the compression and purification sections 212, 214 to the inlet header of the gas storage 220. A control valve 222a is located in the inlet feed line 222 to control flow of gas into the gas storage resource 220.

An outlet return feed line 224 extends from the outlet header of the gas storage resource 220 to the supply feed line 240 upstream of an inlet header of the compression section 212. Flow from the gas storage resource 220 is controlled by control valve 224a which selectively enables gas from storage to be fed back into the supply feed line 240 and into the compression section 212 and purification section 214 via return line 224.

A gas control system 250 is provided to control the flow of gas within the system 200. The gas control system 250 comprises two control levels—Hydrogen production pressure control via pressure indicator controller (PIC) 252 and production rate control for controlling Hydrogen feed flow to the downstream process unit 230 via flow indicator controller (FIC) 254.

The above features 252 and 254 correspond to features 152 and 154 of the embodiment above and will not be described in detail here, save to note that two of each of PIC 252 and FIC 254 are provided in this embodiment.

As for the second embodiment of FIG. 2, the PIC 252 is operable to control valves 222a and 224a in order to regulate the pressure of gas in the discharge header 244 downstream of the production process and upstream of the Ammonia production plant 230.

The PIC 252 comprises a regulating split-range controller and utilises proportional-integral (PI) control of the control variable of the supply feed line 240 pressure P downstream of the discharge header 244.

The PIC 152 is operable to maintain a constant pressure set point SP(P) for the pressure P of Hydrogen flowing to the Ammonia production plant 230. This may be determined manually, automatically or empirically. In embodiments, the pressure set point SP(P) is set at a feed pressure for optimal operation of the Ammonia production plant 230.

The PIC 252 utilises a PI control loop whereby the difference error between the measured pressure P and the desired set point pressure SP(P) for supply of Hydrogen to the Ammonia plant 230 is first determined according to equation 1).

If the output value from the split-range block has a range between 100% and 50% then then control valve 222a is manipulated. Conversely, if the output value from the split-range block has a range between 50% and 0% then then control valve 224a is manipulated. In embodiments, the split range PIC 252 uses exclusive valve sequencing such that an "either-or" relationship exists between the valves 222a, 224a and gas flows through one valve or through the other, but never through both simultaneously.

In other words, when the PIC 252 output is between 50 and 100%, control valve 222a is progressively opened to enable Hydrogen gas flow to the Hydrogen gas storage resource 220. This situation may occur when the gas pressure P is above set point SP(P) such that the Hydrogen production plant 210 is producing more gas per unit time than is required by the Ammonia production plant 230, and as such the excess gas is surplus to requirements. In this scenario, the gas pressure P in the discharge header 244 of the supply feed line 240 is reduced by transferring excess gas to the gas storage resource 220 for storage and later use.

Concomitantly, if the Hydrogen gas pressure P is lower than the set point SP(P), then the Hydrogen production plant 210 is unable to produce gas at the required pressure (potentially due to lack of available renewable power) and stored Hydrogen gas from the gas storage resource 220 is required to supplement the produced gas in order to maintain the desired set point SP(P) pressure of gas P as feedstock for the Ammonia Production plant 230. Consequently, if the PIC 252 output is between 50% and 0% then gas flows from the gas storage resource 220 to the inlet to the compressor section 212 to supplement the produced gas.

In embodiments, at peak Hydrogen production, around 25% excess Hydrogen is produced which is then directed, using the split range controller, to the Hydrogen storage resource 220. When the renewable power is reduced, Hydrogen production is reduced, and the PIC 252 will reduce the flow to Hydrogen storage 220. Eventually, the flow to the Hydrogen storage 220 will close and the flow from the storage 220 to the compression section 212 will start when the available power drops further. This control is accomplished automatically by the split-range PIC 254 which aims to keep the feed flow to the Ammonia plant 230 substantially constant.

Gain scheduling is an advantageous part of the control system. In this embodiment, the gain scheduling is implemented in two discrete regions:

1) If output of PIC 252>=50%, Kc=2.5
    Else, Kc=0.5 where Kc is the gain of the PIC controller 252.

Flow control to the Ammonia plant 230 is also necessary. In this regard, the control system 250 implements production rate control for controlling feed flow to the Ammonia plant 230 via the flow indicator controller (FIC) 254.

The FIC 254 utilises a supervisory control system to control valve 244a in the feedstock header 244 providing gas to the Ammonia plant 230. The FIC 254 implements a proportional integral (PI) control system to control the control variable PV(F) corresponding to the flow rate F in the supply feed line 240 downstream of the discharge header 244.

In embodiments, the FIC 254 controls a feedstock flow rate F by setting a flow set point SP(F) at least in part in dependence upon the Hydrogen gas pressure in the storage resource 220 and/or the rate of change of Hydrogen gas pressure in the storage resource 220.

In embodiments, the FIC 254 controls the feedstock flow rate F in dependence upon the gas pressure of the gas storage resource 220. In other words, the target set point SP(F) of the FIC 230 for the flow to the ammonia plant can be set by the pressure levels in the Hydrogen storage. This may, in embodiments, be achieved by setting a new flow set point SP(F) by means of a look-up table or other implemented scheme with measured pressure values compared to predetermined threshold levels.

Table 1 below shows a simplified scheme for scheduling SF(F) values:

TABLE 1

| Index | P (bara) | Target SP(F) |
|---|---|---|
| 1 | 26 | SP(F0) |
| 2 | 21 | 85% SP(F0) |
| 3 | 16 | 70% SP(F0) |
| 4 | 11 | 50% SP(F0) |
| 5 | 7 | 25% SP(F0) |

Note that in Table 1 the standard operating pressure in the Hydrogen storage resource 220 at design conditions is 26 bara (26 bar absolute). However, this is not intended to be limiting and any suitable pressure values may be used depending upon the nature of the storage resource 220.

Further, the set point SP(F) of the FIC 254 for the flow control to Ammonia plant at design conditions is SF(F0). As the pressure in the Hydrogen storage resource 220 decreases, then the set point SP(F) is concomitantly reduced to a percentage of the design condition set point value SP(F0).

The above table illustrates pressure bands for the pressure of Hydrogen gas in the Hydrogen storage resource 220 at which specific set point flow rates SP(F) are implemented. For example, index 1 illustrates a band of pressures from >21 bara to 26 bar at which design flow rate SP(F0) is applicable.

It is further noted that the conditions and parameters illustrated above are illustrative and non-limiting. Other configurations or parameters may be used with the described embodiments.

When the pressure in the Hydrogen storage resource 220 drops from one index to another (e.g., index 1 to index 2), the flow rate set point SP(F) cannot be instantaneously changed. Rather, the change of the flow rate set point SP(F) needs to account for the ramp rate of the Ammonia plant 230 which, in embodiments, is relatively slow. A change in capacity of 3% per minute is acceptable in this regard. Consequently, whilst the ramp rate change is continuous and the set point changes discrete, a time delay or ramp reduction needs to be applied to the Ammonia plant 230 to enable a smooth and safe transition to the new production rate defined by the new flow rate set point SP(F).

In summary, the disclosed embodiment is operable to 1) send excess produced Hydrogen to Hydrogen storage at high levels of available renewable power and withdraws Hydrogen from the Hydrogen storage at low levels of available renewable power via a split-range control loop implementation as described above; and 2) regulate the feed to an Ammonia plant according to the Hydrogen storage inventory.

This approach ensures that 1) the production rate in Ammonia plant is regulated in a controlled manner with an acceptable, safe and robust rate of change; and 2) the Ammonia plant can continue to operate with acceptable feed flow without the risk of shutdowns due to depletion of Hydrogen from storage and the complete unloading of Hydrogen production from the electrolysers.

Finally, in the case of unloading of Hydrogen production from renewable power, the sequence in the control scheme includes:

1) Reduce the flow to Hydrogen storage at a rate in accordance to the rate of unloading of Hydrogen production from the electrolysers and stops the flow to storage when the unloading reaches certain level.

2) Once the flow to storage stops, Hydrogen is withdrawn from the storage to maintain a specific flow set point to the Ammonia plant.

When Hydrogen production from the electrolysers is sufficiently unloaded and Hydrogen inventory becomes low, the flow to the Ammonia plant can be reduced at the allowable rate (for example, at 3%/min) until depletion of the storage.

It is noted that 1) and 2) above are accomplished by a split-range controller. Further, due to the significant change in process dynamics, gain scheduling is embedded in the split-range controller.

METHOD

FIG. 4 shows a method according to an embodiment. In embodiments, there is provided a method of controlling supply of a feedstock gas from an industrial gas production facility to a downstream process. At least some steps of the method are executed by at least one hardware processor.

The industrial gas production facility (which, in embodiments, may be a Hydrogen production plant) is operable to supply a feedstock gas from an industrial gas facility to a downstream process. The industrial gas facility comprises an industrial gas production plant operable to produce a feedstock gas at a variable production rate for supply to the downstream process, and a gas storage resource operable to store produced feedstock gas.

In specific embodiments, the industrial gas production plant is powered by a power network including one or more renewable power sources and comprises a supply feed line having a supply outlet to the downstream process and a gas storage resource having an input storage feed line and an output storage feed line each in fluid communication with the supply feed line to form a storage feed loop therebetween.

At step 300, feedstock gas is provided from the industrial gas production facility to the supply feed line to the downstream process at a time-varying production rate and production pressure. In embodiments, the production rate and pressure may be dependent at least in part upon the power available from the power network. In embodiments, this power network may include one or more renewable sources.

At step 310, the pressure of feedstock gas for supply to the downstream process is determined. This may be measured at any suitable position upstream of the downstream process. In embodiments, this may be determined in the supply feed line. In embodiments, it may be determined at or adjacent the supply outlet of the supply feed line to the downstream process.

At step 320, a control system is used to control selectively a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure.

In other words, the flow of gas to/from the gas storage resource is used to adjust the pressure of the feedstock gas in order to achieve a selected set point pressure. The selected set point pressure is, in embodiments, a constant.

At step 330, a flow rate of feedstock gas to the downstream process is selectively controlled in dependence upon at least one operational parameter of the gas storage resource. The value of the selected set point flow rate is selected in dependence upon at least one operational parameter of the gas storage resource. The operational parameter may be gas pressure in the gas storage resource which provides an indication of the available gas resources in the storage resource.

While the invention has been described with reference to the preferred embodiments depicted in the figures, it will be appreciated that various modifications are possible within the spirit or scope of the invention as defined in the following claims.

For example, whilst the present embodiments have been described in relation to an Ammonia plant as a downstream end process, the present invention is applicable to any other suitable form of industrial gas plant utilising, at least in part, renewable power. For example, the industrial gas plant or gas complex may be a methanol production facility. Other alternatives will be apparent to one having ordinary skill in the art.

By way of further example, whilst the above embodiments relate to industrial gas production plants that have variable production rates and variable production pressures resulting at least in part from a variable power supply comprising one or more renewable power sources, this need not be the case.

Alternatively or additionally, the variable production rates and variable production pressures may result from other scenarios or strategies. For example, an industrial gas production plant may be run at a higher rate during off-peak energy periods than during peak periods. As a further example, elements of the industrial gas production plant (e.g. Hydrogen electrolysers) may be taken offline for repair or maintenance, causing a reduction in production rate and pressure. As a yet further example, power variability may be due to other factors, such as natural events or local activity (e.g. power cuts).

In the specification and claims, the term "industrial gas plant" is intended to refer to process plants which produce, or are involved in the production of industrial gases, commercial gases, medical gases, inorganic gases, organic gases, fuel gases and green fuel gases either in gaseous, liquified or compressed form.

For example, the term "industrial gas plant" may include process plants for the manufacture of gases such as those described in NACE class 20.11 and which includes, non-exhaustively: elemental gases; liquid or compressed air; refrigerant gases; mixed industrial gases; inert gases such as carbon dioxide; and isolating gases. Further, the term "industrial gas plant" may also include process plants for the manufacture of industrial gases in NACE class 20.15 such as Ammonia, process plants for the extraction and/or manufacture of methane, ethane, butane or propane (NACE classes 06.20 and 19.20), and manufacture of gaseous fuels as defined by NACE class 35.21. The above has been described with respect to the European NACE system but is intended to cover equivalent classes under the North American classifications SIC and NAICS. In addition, the above list is non-limiting and non-exhaustive.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

In the discussion of embodiments of the present invention, the pressures given are absolute pressures unless otherwise stated.

All prior teachings above are hereby incorporated herein by reference. No acknowledgement of any prior published document herein should be taken to be an admission or representation that the teaching thereof was common general knowledge in Australia or elsewhere at the date thereof.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "sections", "facilities", "modules", "units" or "components," it is noted that those terms are not limited to single units or functions. Moreover, functionality attributed to some of the sections, facilities, modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method of controlling the supply of a feedstock gas from an industrial gas facility to a downstream process, the industrial gas facility comprising: an industrial gas production plant operable to produce a feedstock gas at a variable production rate for supply to the downstream process; and a gas storage resource operable to store produced feedstock gas, the method comprising:
   a) determining the pressure of feedstock gas in a supply feed line to the downstream process;
   b) selectively controlling, using a control system, a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and
   c) selectively controlling, using a control system, a flow rate of feedstock gas in the supply feed line to the downstream process in dependence upon at least one operational parameter of the gas storage resource;
   wherein the operational parameter of the gas storage resource comprises one or more of: gas pressure; average gas pressure in the storage resource; mass of gas in the storage resource; rate of change of gas pressure in the storage resource; and/or rate of change of mass of gas in the storage resource.

2. The method according to claim 1, wherein a first valve is located in an input feed line from the supply feed line to the gas storage resource and a second valve is located in an output feed line from the gas storage resource to the supply feed line, and wherein step b) further comprises controlling, using the control system, the first and second valves to control the flow of gas into and out of the gas storage resource.

3. The method according to claim 2, wherein the control system comprises a pressure controller and step b) further comprises utilizing the pressure controller to control the first and second valves in response to a difference between the determined pressure and the predetermined set point pressure of the feedstock gas in the supply feed line to the downstream process.

4. The method according to claim 3, wherein the pressure controller comprises a split range controller and step b) comprises controlling, with the split range controller, the first and/or the second valve in response to an output value of the split range controller.

5. The method according to claim 4, further comprising applying gain scheduling to the split range controller such that the gain of the control response of the split range controller is different for each of the first and second valves.

6. The method according to claim 1, wherein step c) further comprises:
d) determining the value of the operational parameter of the gas storage resource;
e) selecting a set point feed flow rate of the feedstock gas to the downstream process in dependence upon the determined value; and
f) controlling one or more valves in the supply feed line in response to the selected set point feed flow rate.

7. The method according to claim 6, wherein step e) further comprises selecting the set point feed flow rate from a memory or look up table in response to the determined value of the operational parameter of the gas storage resource.

8. The method according to claim 6, further comprising, subsequent to step e):
g) iteratively repeating steps d) to f) and, if the value of a new selected set point feed flow rate is different from the previous value of a set point feed flow selected in a previous iteration, then the method further comprises:
h) varying the set point feed flow rate between the previous value and the new value over a pre-determined time period.

9. The method according to claim 1, wherein the selected set point pressure is a constant pressure.

10. The method according to claim 1, wherein the industrial gas production plant is powered at least in part by a power supply network including one or more renewable power sources, wherein the power supply network has an available power level which is variable over time, and wherein the feedstock gas production rate of the industrial gas production plant is variable at least in part in response to the available power level of the power supply network.

11. The method according to claim 1, wherein the industrial gas production plant comprises a Hydrogen production plant and the downstream process comprises an Ammonia production process.

12. A system for controlling the supply of a feedstock gas from an industrial gas facility to a downstream process, the industrial gas facility comprising: an industrial gas production plant operable to produce a feedstock gas at a variable production rate for supply to the downstream process; and a gas storage resource operable to store produced feedstock gas, the system comprising:
a pressure controller configured to:
determine the pressure of feedstock gas in a supply feed line to the downstream process; and
control a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and
a flow controller configured to control a flow rate of feedstock gas in the supply feed line to the downstream process in dependence upon at least one operational parameter of the gas storage resource;
wherein the operational parameter of the gas storage resource comprises one or more of: gas pressure; average gas pressure in the storage resource; mass of gas in the storage resource; rate of change of gas pressure in the storage resource; and/or rate of change of mass of gas in the storage resource.

13. The system according to claim 12, wherein the pressure controller comprises a Proportional-Integral controller.

14. The system according to claim 12, wherein the pressure controller comprises a split range controller configured to generate a split range output value and configured to control a plurality of valves in response to the split range output value.

15. The system according to claim 14, wherein the split range controller comprises gain scheduling such that the gain of the control response of the split range controller is different for each of the valves.

16. The system according to claim 12, further configured to:
determine the value of the operational parameter of the gas storage resource;
select a set point feed flow rate of the feedstock gas to the downstream process in dependence upon the determined value; and
control, using the flow controller, one or more valves in the supply feed line in response to the selected set point feed flow rate.

17. The system of claim 12, wherein a compression section is located downstream of the industrial gas production plant to compress the produced feedstock gas.

18. A non-transitory computer readable storage medium storing a program of instructions executable by a machine to perform a method of controlling the supply of a feedstock gas from an industrial gas facility to a downstream process, the industrial gas facility comprising: an industrial gas production plant operable to produce a feedstock gas at a variable production rate for supply to the downstream process; and a gas storage resource operable to store produced feedstock gas, the method comprising:
a) determining the pressure of feedstock gas in a supply feed line to the downstream process;
b) selectively controlling, using a control system, a flow of feedstock gas from the supply feed line to the gas storage resource or from the gas storage resource to the supply feed line in response to the determined pressure in order to regulate the pressure of the feedstock gas in the supply feed line to the downstream process at a predetermined set point pressure; and
c) selectively controlling, using a control system, a flow rate of feedstock gas in the supply feed line to the downstream process in dependence upon at least one operational parameter of the gas storage resource;
wherein the operational parameter of the gas storage resource comprises one or more of: gas pressure; average gas pressure in the storage resource; mass of gas in the storage resource; rate of change of gas pressure in the storage resource; and/or rate of change of mass of gas in the storage resource.

* * * * *